United States Patent
Brunneke

(10) Patent No.: US 8,235,622 B2
(45) Date of Patent: Aug. 7, 2012

(54) JOINT AND/OR BEARING ARRANGEMENT

(75) Inventor: Hans-Gerd Brunneke, Georgsmarienhütte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 358 days.

(21) Appl. No.: 12/305,717

(22) PCT Filed: Jun. 12, 2007

(86) PCT No.: PCT/DE2007/001041
§ 371 (c)(1),
(2), (4) Date: Dec. 19, 2008

(87) PCT Pub. No.: WO2008/000219
PCT Pub. Date: Jan. 3, 2008

(65) Prior Publication Data
US 2009/0308681 A1 Dec. 17, 2009

(30) Foreign Application Priority Data
Jun. 27, 2006 (DE) .......................... 10 2006 029 778

(51) Int. Cl.
*F16C 11/06* (2006.01)
(52) U.S. Cl. ....................................... 403/135; 403/133
(58) Field of Classification Search .................. 403/132, 403/133, 135, 140, 145, 138, 144, 31, 34, 403/35, 36, 37, 38, 39; 464/162; 280/93.511, 280/93.512
See application file for complete search history.

(56) References Cited

U.S. PATENT DOCUMENTS

| 2,736,580 | A | * | 2/1956 | Boetcker | 403/132 |
| 3,675,953 | A | * | 7/1972 | Glatz | 403/90 |
| 3,703,761 | A | * | 11/1972 | Van Winsen et al. | 29/436 |
| 4,708,510 | A | * | 11/1987 | McConnell et al. | 403/90 |
| 6,854,917 | B2 | * | 2/2005 | Kraine et al. | 403/133 |

FOREIGN PATENT DOCUMENTS

| DE | 1 057 833 | | 5/1959 |
| DE | 44 28 870 | * | 11/1995 |
| DE | 44 21 589 | * | 12/1995 |
| DE | 44 45 251 | | 1/1996 |
| DE | WO 00/15967 | | 3/2000 |
| EP | 0 007 430 | * | 2/1980 |
| EP | 1 460 290 | | 9/2004 |
| WO | WO 2005/066510 | | 7/2005 |

* cited by examiner

*Primary Examiner* — Michael P Ferguson
(74) *Attorney, Agent, or Firm* — McGlew and Tuttle, P.C.

(57) ABSTRACT

A joint and/or bearing arrangement (1) is provided with a joint pin (2), whose head area (3) is mobile in relation to a receiving joint shell (4). The joint shell (4) is arranged in the mounted position in a receiving space acting as a housing (5). At least one border (10) with axial barriers (11) surrounds the joint shell (4) in some areas and is arranged between the joint shell (4) and the housing (5).

18 Claims, 3 Drawing Sheets

JOINT AND/OR BEARING ARRANGEMENT

CROSS REFERENCE TO RELATED APPLICATIONS

This application is a United States National Phase application of International Application PCT/DE2007/001041 and claims the benefit of priority under 35 U.S.C. §119 of German Patent Application DE 10 2006 029 778.4 filed Jun. 27, 2006, the entire contents of which are incorporated herein by reference.

FIELD OF THE INVENTION

The present invention pertains to a joint and/or bearing arrangement with a joint pin having a head area that is mobile in relation to a receiving joint shell, wherein joint shell is arranged in the mounted position in a receiving space acting as a housing. The present invention also pertains to a motor vehicle with at least one such joint and/or bearing arrangement, especially in chassis and/or steering parts.

BACKGROUND OF THE INVENTION

In joint arrangements that have a pin, which is to be held movably with its head area in a joint shell, this joint shell must be formed from a relatively soft material in order to achieve a sufficient absorption and low-noise operation of the joint and/or bearing arrangement. For example, a POM plastic is used for a joint shell. The difficulty arises in this connection that plastics suitable for the requirements imposed on the joint shell frequently reach their yield point at high temperatures, for example, already at about 80° C., and/or under stress, as a result of which plastic and therefore irreversible deformation, e.g., a reduction in the thickness, of the joint shell may occur under radial stress, which leads to a gap in the joint and to reduced stability of the joint shell.

SUMMARY OF THE INVENTION

The basic object of the present invention is, especially in joints subject to radial stresses, to achieve a permanent improvement of the dimensional stability and stability of the joint shell.

The present invention accomplishes this object by a joint and/or bearing arrangement comprising a joint pin having a head area. A joint shell receives the head area with the head area being mobile in relation to the joint shell. A receiving space is defined by a joint or bearing arrangement housing. The joint shell is arranged in the a mounted position in the receiving space. A border is provided with axial barriers. The border surrounds the joint shell in some areas, The border is arranged between the joint shell and the housing.

According to another aspect of the invention, a motor vehicle is provided having the joint and/or bearing arrangement features. This motor vehicle advantageously comprises a first chassis/steering part connected to the joint pin and a second chassis/steering part connected to the joint or bearing arrangement housing.

Flow of the material of the joint or bearing shell due to mechanical constraint is reliably prevented from occurring by the present invention. The pressure occurring under radial stress through the head area of the pin on the circumferential walls of the joint or bearing shell cannot lead to yielding of the wall material in the axial direction, or it can lead to reduced yield only at most, in the ideal case because of the axial barriers. Therefore, the wall thickness cannot decrease, and a reduction in the thickness of the material is prevented.

If the axial barriers are directly in contact with the joint shell in the extension of their circumferential walls, these are held with their circumferential walls in the border without clearance, and their axial flow motion is completely prevented from occurring.

In particular, the axial barrier can be designed at the area at which the pin passes through as a circumferential edge of the border protruding inwardly from the inner wall of the housing and cover at least 10% of the diameter of the housing, i.e., an area of the diameter that is greater than the thickness proper of the circumferential wall of the joint. Flow of the material of the joint shell is thus prevented from occurring in an especially reliable manner.

The border forms an intermediate housing, which may be a one-piece intermediate housing and is at least essentially closed outside an area through which the joint pin passes, which is favorable for the stability and manufacture of the border. The intermediate housing may be fully closed in the manner of a tub in the area located opposite the passage opening.

The outer housing does not have to form a separate joint component, but it may also be designed as an extrusion coating of the joint shell, e.g., as a control arm of a chassis, depending on the intended use. The joint arrangement can then nevertheless be able to be replaced by pressing out in order to make it possible to use the control arm further when needed even in case of replacement of the joint.

Since an axial travel may nevertheless be available for the joint pin when mounting joints that are stressed only radially during operation, the provision of a means securing against rotation in the housing is especially helpful for the border. This securing means may be formed, for example, by a bolt meshing with a slot-like recess of the border.

It is very favorable to make the border of steel or a plastic that is harder than the joint shell.

Prestressing of the joint and/or bearing arrangement ensures clearance-free and rattle-free operation.

The present invention can be used, in particular, in joint arrangements that are stressed only axially during the phase of installation and are stressed only radially during operation.

Other advantages and features of the present invention appear from exemplary embodiments of the subject of the present invention, which are shown in the drawings and will be described below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
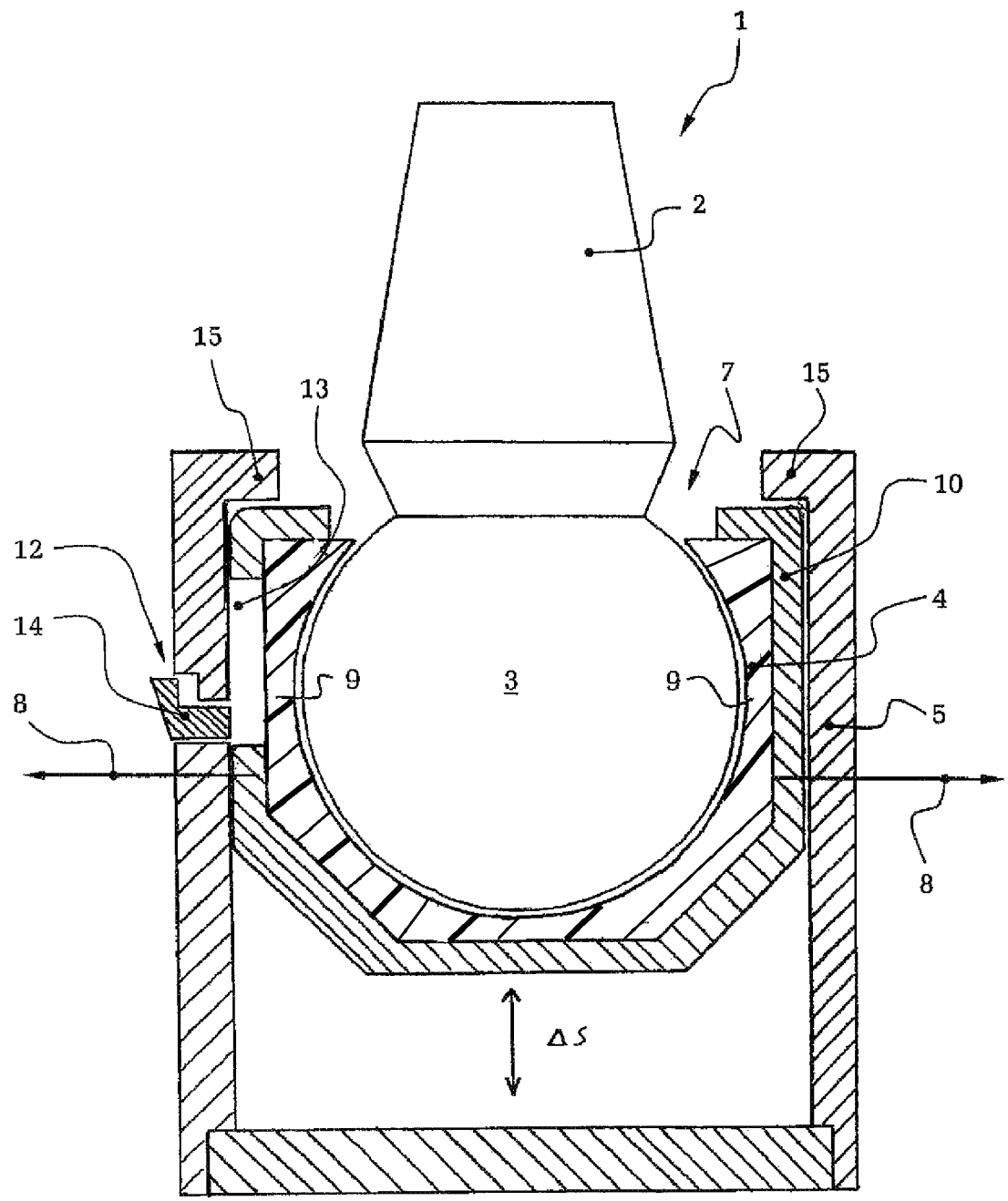
FIG. 1 is a schematic, cut-away general drawing of a joint and/or bearing arrangement according to the present invention with a one-piece border and with a means for securing the border against rotation.
Figure 2:
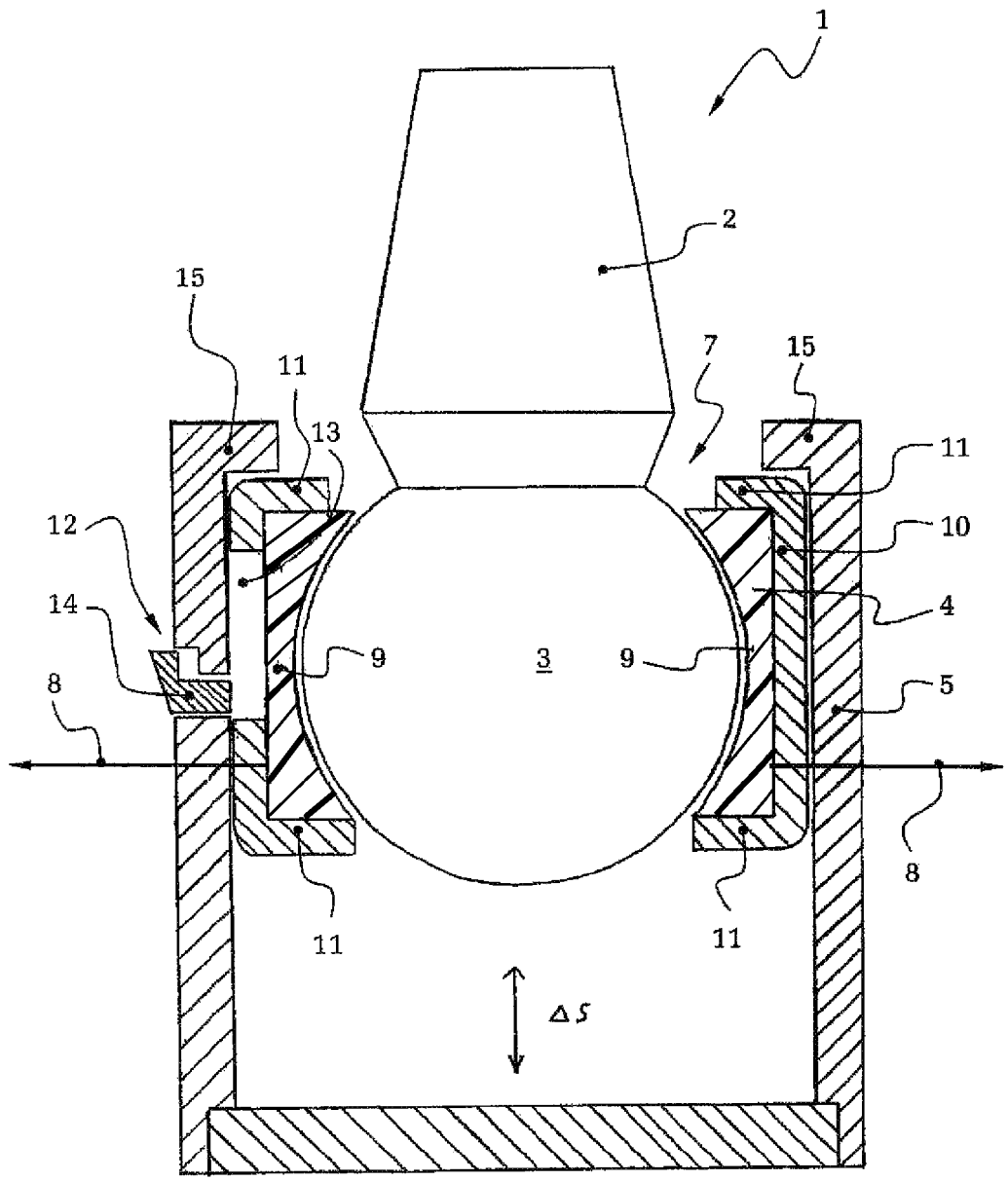
FIG. 2 is a view similar to that in FIG. 1 of an alternative joint arrangement according to the present invention with an essentially ring-shaped border, which is open axially outside of barriers arranged in the outer area of the housing diameter, and of a likewise ring-shaped joint shell.

Referring to the drawings in particular, the joint arrangement 1 according to FIG. 1 comprises an axially extended joint pin 2 with an expanded head area 3, which is formed, for example, by an essentially spherical bulge. This head area 3 can be held movably in and in relation to a usually permanently lubricated joint or bearing shell 4, which receives the head area 3. The joint shell 4 according to FIG. 1 is essentially closed outside the passage of the pin, whereas the joint shell 4 according to FIG. 2 is rather ring-shaped.

Furthermore, joint shell 4 is in turn partially surrounded at least radially on the outside by a receiving space acting as a housing (outside housing or joint/bearing arrangement housing) 5. The housing 5 does not have to form a separate assembly unit, but it may also be an integral part of a control arm 6, which extends, for example, around the joint arrangement 1 in the mounted state.

Such a control arm 6 may be manufactured, for example, by extrusion coating or embedding with a liquid, hot material, for example, by zinc diecasting, wherein the control arm 6 is rigid and dimensionally stable in its mold after the subsequent cooling and can form an integral housing 5 without further aftertreatment.

The joint and/or bearing arrangement 1 comprises, furthermore, a gasket, which is frequently designed as a sealing bellows and is not shown here. The sealing bellows joins the joint shell 4 in the area of passage opening 7 left by the housing 3 for the pin 2.

The exemplary embodiment shows a joint 1, which is stressed only radially during the operation and which does, however, allow an axial clearance Δs, which is needed for mounting and removing, for example, the control arm 6 within the chassis. An axial stressing of this housing 1 during the ongoing operation is not intended here; the joint arrangement also continues to be able to be replaced alone even in case of embedding in a control arm 6 made integrally in one piece by extrusion coating.

Figure 3:
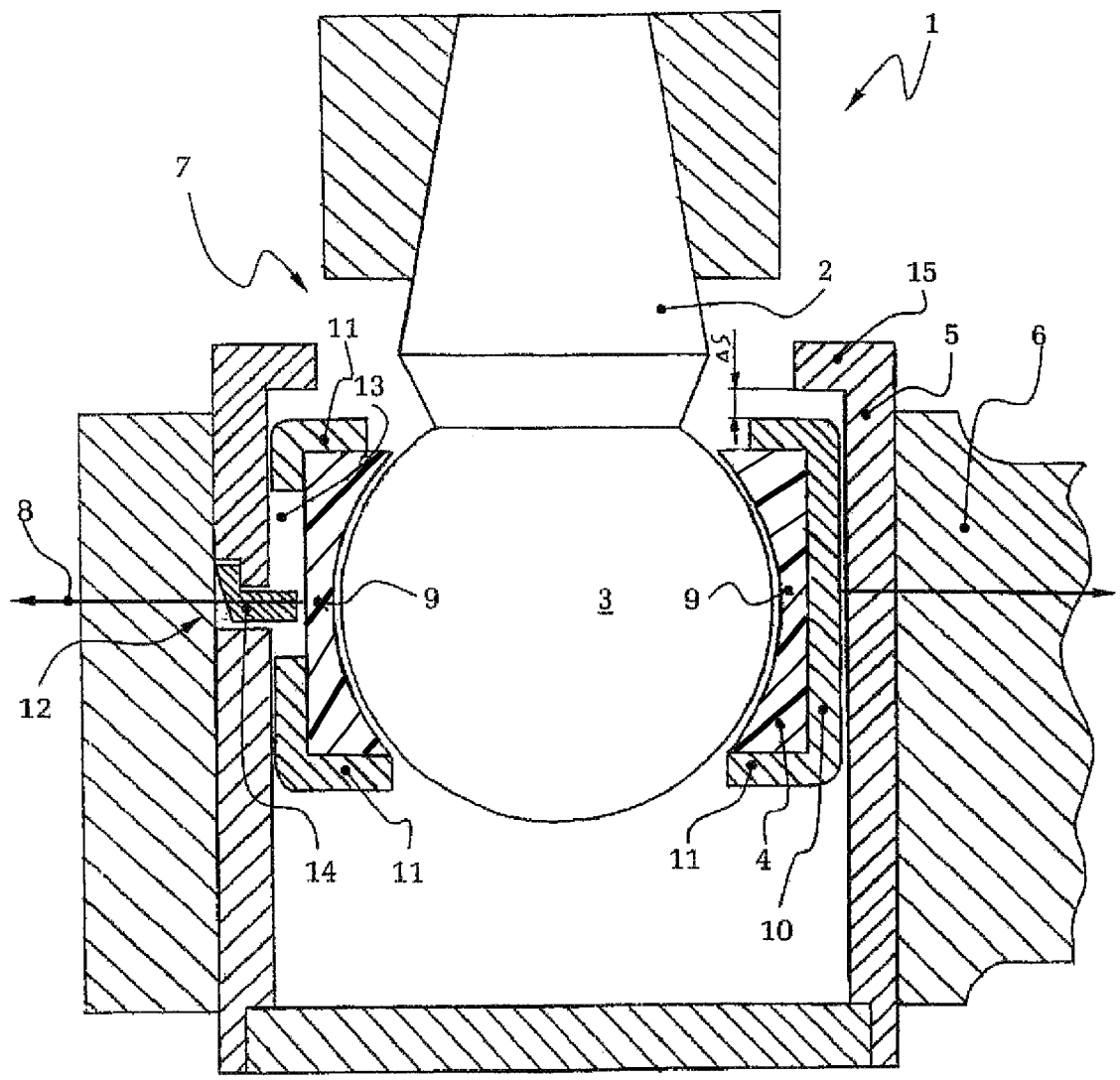
FIG. 3 is the joint and/or bearing arrangement according to FIG. 2 in the installed position in which it is pressed into a control arm.

Joint shell 4, which is closed outside the passage opening 7 for the pin 2 and outside perforations for the expanding wings in the first version according to FIG. 1 and has a nearly ring-shaped design in the second version according to FIGS. 2 and 3, may be made, for example, from a PA, POM, PBT, PEEK or crosslinked types of these materials (for example, by electron beam crosslinking). These guarantee the needed temperature stability and are nevertheless sufficiently soft and yield elastically to offer a high level of comfort and low noise during operation.

Since radial forces 8 act on the circumferential walls 9 of the joint shell 4 during operation because of the radial stress, so that these, yielding to these forces, show the tendency of flowing in the axial direction, especially under high stress and/or at high temperatures, a border 10 with axial barriers 11, which exactly surrounds the joint shell in some areas, is arranged here between joint shell 4 and housing 5. Axial barriers 11 are defined as barriers that secure the material of the joint shell 4 against axial flow and themselves protrude radially inwardly with one component from the outer edge of the border 10.

The barriers 11 may also have an oblique extension as a housing wall especially in the closed intermediate housing 10 according to FIG. 1.

A plurality of borders 10, for example, borders extending over each other, would, in principle, be conceivable as well.

The axial barriers 11 are directly in contact with the joint shell 4, so that this is set firmly and without clearance at the axial edges of its circumferential walls 9. Yielding of material of the joint shell 4 in the axial direction is completely prevented hereby from occurring. Housing edge 15 can be closed, for example, by beading after introduction of the joint shell 4 and the border 10.

In the exemplary embodiment according to FIG. 1, border 10 forms an intermediate housing, which is closed at least essentially outside a passage area 7 for the joint pin 2 outside perforations for forming and moving expanding wings. Border 10 is designed here in one piece for a simple manufacturing process.

By contrast, at the passage area 7 of the pin 2, the barrier located there and securing against axial flow is formed as a circumferential edge of border 4 protruding inwardly from the inner wall of the housing, which edge covers at least about 10%, preferably 15%-20% of the diameter of the joint shell 4. Thus, there remains a sufficiently large passage area 7 even for a pivoting motion of pin 2, on the one hand, and, on the other hand, the walls 9 of the joint shell are covered possibly wide enough to ensure that practically no flow of material of the joint shell 4 can take place any longer even under a high radial stress 8 past the barriers 11, either. An even larger part of the diameter is preferably covered by the barriers 11 located there in the area located axially opposite the passage opening 7.

To effectively prevent the flow or creep of material, border 10 is made of steel or a plastic that is harder than the joint shell 4, e.g., PEEK, at least in the area of the axially acting barriers. Yielding deformation of the barriers 11 can be ruled out as a result even at high stress. In addition, reinforcing with fibers is possible. Border 10 may also be designed as a multilayer border and have, e.g., on the outer side, an anti-friction coat or plastic coating to improve the tribological properties.

In joint arrangements 1 shown in the drawing, the joint shells 4 equipped with the pin, mounted in their respective border 10, can be inserted into housing 5 for mounting in an axially displaceable manner. To facilitate mounting, a means securing against rotation 12 is provided. This comprises a bolt, cam 14 or the like in this embodiment, meshing with an axially extended elongated hole 13 of joint shell 4, wherein the axial length of the elongated hole 13 corresponds at least to the path of displacement As in the housing 5. Other means securing against rotation are possible as well.

To absorb the axial and/or radial forces occurring during operation and to guarantee clearance-free and rattle-free operation, a still mobile seating of the head area 3 in the joint shell 4 and firm seating of the joint shell 4 in border 10, which is possibly still axially displaceable in relation to the housing 5, are to be guaranteed. A prestress, which remains at least nearly constant over the service life, can be introduced into the joint shell 4 through the border 10.

Such joint and/or bearing arrangements 1 can be advantageously used in the embodiment according to the present invention especially within chassis and/or steering parts of motor vehicles. Such a vehicle is provided with the joint pin as a first chassis/steering part connection wherein a first chassis/steering part is connected to the joint pin and the joint or bearing arrangement housing as the second chassis/steering part connection wherein a second chassis/steering part is connected to the joint or bearing arrangement housing. Also the joint and/or bearing arrangements 1 can be employed to compensate, for example, tolerances due to design between the control arm and the wheel carrier during mounting in the vehicle.

While specific embodiments of the invention have been shown and described in detail to illustrate the application of the principles of the invention, it will be understood that the invention may be embodied otherwise without departing from such principles.

The invention claimed is:

1. A or bearing arrangement comprising:
a ball and socket joint pin having a ball joint head;
a joint shell comprising a joint shell circumferential wall defining a cavity having a joint shell opening, said ball joint head being pivotably arranged within said cavity;
a ball and socket joint housing comprising a joint housing circumferential wall defining a receiving space having a housing opening, said joint housing circumferential wall comprising a joint housing hole;
a border comprising a border circumferential wall having axial barriers at opposing ends and said border circumferential wall defining a cavity, said joint shell being fixed within said cavity of said border, said border circumferential wall comprising an elongated hole, said border being arranged within said receiving space between said joint shell and said ball and socket joint housing, said ball and socket joint pin extending through said joint shell opening and said housing opening;
a fastener, at least a portion of said fastener being fixed within said joint housing hole, said fastener extending through said joint housing hole such that said fastener is slidably received within said elongated hole and said border and said joint shell are movable in said ball and socket joint housing in an axial direction and rotation of said border within said ball and socket housing is prevented.

2. A joint or bearing arrangement in accordance with claim 1, wherein the axial barriers are directly in contact with a radially extending end surface of the joint shell, each of said axial barriers comprising a border end portion, said border end portion extending in a radially inward direction with respect to a longitudinal axis of said ball and socket joint pin, wherein an end surface of one said border end portion faces said ball and socket joint pin.

3. A joint or bearing arrangement in accordance with claim 2, wherein said border forms an intermediate housing, which is at least essentially closed except for a passage area through which said joint pin passes.

4. A joint or bearing arrangement in accordance with claim 3, wherein each of said axial barriers is formed at the passage area of the pin as an edge of said border, which said edge protrudes inwardly from an inner wall of the housing.

5. A joint or bearing arrangement in accordance with claim 4, wherein the axial barrier covers at least 10% of the diameter of the joint shell.

6. A joint or bearing arrangement in accordance with claim 2, wherein said housing comprises an extrusion coating of said joint shell.

7. A joint or bearing arrangement in accordance with claim 2, wherein said border has a one-piece design to form a one-piece border, said border comprising an axial border portion, said axial border portion extending parallel to said longitudinal axis, said axial border portion being integrally connected to each of said axial barriers.

8. A joint or bearing arrangement in accordance with claim 2, wherein said border is made of steel or a plastic that is harder than the joint shell.

9. A joint or bearing arrangement in accordance with claim 2, wherein said joint shell is prestressed via said axial barriers during operation, said one said border end portion being located at one end of said joint shell, another said border end portion being located at another end of said joint shell, wherein an end surface of said another said border end portion is parallel to said longitudinal axis of said ball and socket joint pin.

10. A joint or bearing arrangement in accordance with claim 9, wherein said joint shell is stressed essentially axially during mounting and essentially radially via said one border end portion and said another said border end portion during operation of the ball and socket joint, said one border end portion and said another said border end portion being integrally connected to an axially extending border portion, said one said border end portion and said another said border portion being substantially perpendicular to said axially extending border portion.

11. A motor vehicle, comprising:
a ball and socket joint comprising a ball joint pin having a ball joint head, a joint bearing shell, a ball and socket joint housing comprising a joint housing circumferential wall comprising a joint housing hole and defining a receiving space having a housing opening, a border comprising a border circumferential wall having axial barriers at opposing ends and defining a border cavity and a securing means for preventing rotation of said border in said ball and socket joint housing, said joint shell comprising a joint shell circumferential wall defining a cavity having a joint shell opening, said ball joint head being pivotably arranged within said joint shell cavity, said joint shell being fixed within said border cavity, said border circumferential wall comprising an elongated hole, said border being arranged within said receiving space between said joint shell and said ball and socket joint housing, said ball joint pin extending through said joint shell opening and said housing opening, said securing means comprising a fastener and said elongated hole, at least a portion of said fastener being fixed within said joint housing hole and said fastener extending through said elongated hole such that said border and said joint shell are movable in said ball and socket joint housing in an axial direction and said border is rotationally fixed within said ball and socket housing.

12. A motor vehicle according to claim 11, wherein said ball joint pin comprises a chassis/steering part connection part and said ball and socket joint housing comprises a second chassis/steering part connection part, one of said axial barriers comprising an end surface facing said ball joint pin, said border comprising an axial border portion integrally connected to each of said axial barriers, said axial border portion extending parallel to said longitudinal axis, another one of said axial barriers comprising another axial barrier end surface, said another axial barrier end surface and said end surface of said one of said axial barriers being parallel to said longitudinal axis of said ball and socket joint pin.

13. A joint or bearing arrangement comprising:
a joint pin having a joint head;
a joint shell comprising a joint shell wall defining a joint shell cavity having a joint shell opening, said joint head being pivotably arranged within said joint shell cavity;
a joint or bearing arrangement housing comprising a housing wall defining a receiving space having a housing opening, said housing wall comprising a housing wall hole;
a border comprising a border wall having axial barriers, said border wall defining a border cavity, said joint shell being fixed in said border cavity, each of said axial barriers being in contact with one end of said joint shell, said border being arranged between the joint shell and said joint or bearing arrangement housing, said joint pin extending through said joint shell opening and said housing opening said border wall comprising an elongated hole; and a securing means for securing said border against rotation relative to said housing and for allowing movement of said border in an axial direction relative to said housing, said securing means comprising a fastener and said elongated hole, at least a portion of said fastener being arranged in said housing wall hole and said at least said portion of said fastener extending through said elongated hole such that said fastener is slidably received within said elongated hole and said border and said joint shell are movable in said housing in an axial direction and rotation of said border within said housing is prevented.

14. A joint or bearing arrangement in accordance with claim 13, wherein the axial barriers are directly in contact with the joint shell and said axial barrier covers at least 10% of the diameter of the joint shell.

15. A joint or bearing arrangement in accordance with claim 13, wherein said border forms an intermediate housing to close off said joint shell from an exterior of said joint shell except for a passage area through which said joint pin passes.

16. A joint or bearing arrangement in accordance with claim 13, wherein said housing comprises an extrusion coating portion of a control arm surrounding said joint shell.

17. A joint or bearing arrangement in accordance with claim 13, wherein said border comprises a single integral part.

18. A joint or bearing arrangement in accordance with claim 13, wherein said border is made of steel or a plastic that is harder than said joint shell and said joint shell is prestressed during one or more of mounting of the joint or bearing arrangement and operation of the joint or bearing arrangement, said border comprising an axially extending border portion, said axially extending border portion extending parallel to said longitudinal axis, said axially extending border portion being integrally connected to each of axially barriers, each of said axial barriers being substantially perpendicular to said axially extending portion, said axial barriers comprising a first axial barrier and a second axial barrier, wherein an end surface of said first axial barrier faces said ball and socket joint pin, said end surface of said first axial barrier being parallel to said longitudinal axis, wherein an end surface of said second axial barrier is parallel to said longitudinal axis, said first axial barrier being located on one side of said axially extending border portion and said second axial barrier being located on another side of said axially extending border portion.

* * * * *